United States Patent
Kim et al.

(10) Patent No.: US 7,803,420 B2
(45) Date of Patent: Sep. 28, 2010

(54) METHODS AND APPARATUS FOR INKJETTING SPACERS IN A FLAT PANEL DISPLAY

(75) Inventors: Si-Kyoung Kim, Sunnyvale, CA (US); Sheng Sun, Foster City, CA (US); John M. White, Hayward, CA (US)

(73) Assignee: Applied Materials, Inc., Santa Clara, CA (US)

( * ) Notice: Subject to any disclaimer, the term of this patent is extended or adjusted under 35 U.S.C. 154(b) by 831 days.

(21) Appl. No.: 11/737,141

(22) Filed: Apr. 19, 2007

(65) Prior Publication Data

US 2008/0129947 A1    Jun. 5, 2008

Related U.S. Application Data

(60) Provisional application No. 60/868,311, filed on Dec. 1, 2006.

(51) Int. Cl.
*B05D 5/04* (2006.01)
*B05D 5/06* (2006.01)
*G02F 1/1339* (2006.01)
*B41J 2/145* (2006.01)
*B05B 7/06* (2006.01)

(52) U.S. Cl. .................. 427/68; 427/108; 427/162; 427/258; 427/466; 427/541; 349/155; 349/156; 118/300; 118/313; 347/40

(58) Field of Classification Search .................. 427/68, 427/108, 75; 349/156
See application file for complete search history.

(56) References Cited

U.S. PATENT DOCUMENTS

| 4,845,008 | A | 7/1989 | Nishioka et al. |
| 4,987,043 | A | 1/1991 | Roosen et al. |
| 5,177,627 | A | 1/1993 | Ishiwata et al. |
| 5,232,634 | A | 8/1993 | Sawada et al. |
| 5,399,450 | A | 3/1995 | Matsushima et al. |
| 5,552,192 | A | 9/1996 | Kashiwazaki et al. |
| 5,554,466 | A | 9/1996 | Matsushima et al. |

(Continued)

FOREIGN PATENT DOCUMENTS

EP    0 675 385 A1    10/1995

(Continued)

OTHER PUBLICATIONS

Final Office Action of U.S. Appl. No. 11/494,286 mailed on Mar. 16, 2010.

(Continued)

*Primary Examiner*—Barbara L Gilliam
*Assistant Examiner*—Lisha Jiang
(74) *Attorney, Agent, or Firm*—Dugan & Dugan, PC

(57) ABSTRACT

Method of and apparatus for depositing a spacer on a substrate is provided. The invention includes depositing a first ink including an adhesive agent on a first area of the substrate and depositing a second ink including supporting elements on a second area of the substrate, the second area greater than and encompassing the first area. A portion of the second ink evaporates such that the supporting elements within the second ink migrate into the first area and bond to the adhesive agent in the first ink, forming a spacer. Numerous other aspects are provided.

13 Claims, 7 Drawing Sheets

U.S. PATENT DOCUMENTS

| | | | |
|---|---|---|---|
| 5,705,302 | A | 1/1998 | Ohno et al. |
| 5,716,739 | A | 2/1998 | Kashiwazaki et al. |
| 5,811,209 | A | 9/1998 | Eida et al. |
| 5,916,713 | A | 6/1999 | Ochiai et al. |
| 5,922,401 | A | 7/1999 | Kashiwazaki et al. |
| 5,962,581 | A | 10/1999 | Hayase et al. |
| 5,968,688 | A | 10/1999 | Masuda et al. |
| 6,013,415 | A | 1/2000 | Sakurai et al. |
| 6,071,989 | A | 6/2000 | Sieber et al. |
| 6,087,196 | A | 7/2000 | Sturm et al. |
| 6,153,711 | A | 11/2000 | Towns et al. |
| 6,211,347 | B1 | 4/2001 | Sieber et al. |
| 6,312,771 | B1 | 11/2001 | Kashiwazaki et al. |
| 6,358,602 | B1 | 3/2002 | Horiuchi et al. |
| 6,450,635 | B1 | 9/2002 | Okabe et al. |
| 6,475,271 | B2 | 11/2002 | Lin |
| 6,501,527 | B1 * | 12/2002 | Hirose et al. ................ 349/155 |
| 6,627,364 | B2 | 9/2003 | Kiguchi et al. |
| 6,630,274 | B1 | 10/2003 | Kiguchi et al. |
| 6,695,905 | B2 | 2/2004 | Rozumek et al. |
| 6,762,234 | B2 | 7/2004 | Grizzi |
| 6,836,304 | B2 * | 12/2004 | Sakamaki et al. ........... 349/106 |
| 7,538,149 | B2 | 5/2009 | Aoai |
| 2001/0012596 | A1 | 8/2001 | Kunimoto et al. |
| 2002/0081376 | A1 | 6/2002 | Yonehara |
| 2004/0023567 | A1 | 2/2004 | Koyama et al. |
| 2004/0041155 | A1 | 3/2004 | Grzzi et al. |
| 2004/0075383 | A1 | 4/2004 | Endo et al. |
| 2004/0097699 | A1 | 5/2004 | Holmes et al. |
| 2004/0109051 | A1 | 6/2004 | Bright et al. |
| 2005/0159501 | A1 | 7/2005 | Kiefer-Liptak |
| 2006/0063858 | A1 | 3/2006 | Kang et al. |
| 2006/0092204 | A1 | 5/2006 | White et al. |
| 2007/0014933 | A1 | 1/2007 | Sun et al. |
| 2007/0015847 | A1 | 1/2007 | Sun et al. |
| 2007/0015848 | A1 | 1/2007 | Sun et al. |
| 2007/0065571 | A1 | 3/2007 | White et al. |
| 2007/0263018 | A1 | 11/2007 | Vanini |
| 2008/0022885 | A1 | 1/2008 | Sun et al. |
| 2008/0030562 | A1 | 2/2008 | Sun et al. |

FOREIGN PATENT DOCUMENTS

| | | |
|---|---|---|
| EP | 1 106 360 A1 | 6/2001 |
| JP | 01-277802 | 11/1989 |
| KR | 10-20040067247 | 7/2004 |
| KR | 1020060025102 | 3/2006 |
| WO | WO 02/14076 A1 | 2/2002 |
| WO | WO 2004/026977 | 4/2004 |
| WO | WO 2005/116149 | 12/2005 |

OTHER PUBLICATIONS

Office Action of U.S. Appl. No. 11/494,286 mailed on Sep. 29, 2009.
Office Action of U.S. Appl. No. 11/831,676 mailed on Dec. 16, 2009.
Dec. 28, 2009 Response to Office Action of U.S. Appl. No. 11/494,286 mailed on Sep. 29, 2009.
Office Action of South Korean Patent Application 10-2007-0060369 issued on Feb. 22, 2008.
Apr. 16, 2010 Response to Office Action of U.S. Appl. No. 11/831,676 mailed on Dec. 16, 2009.

* cited by examiner

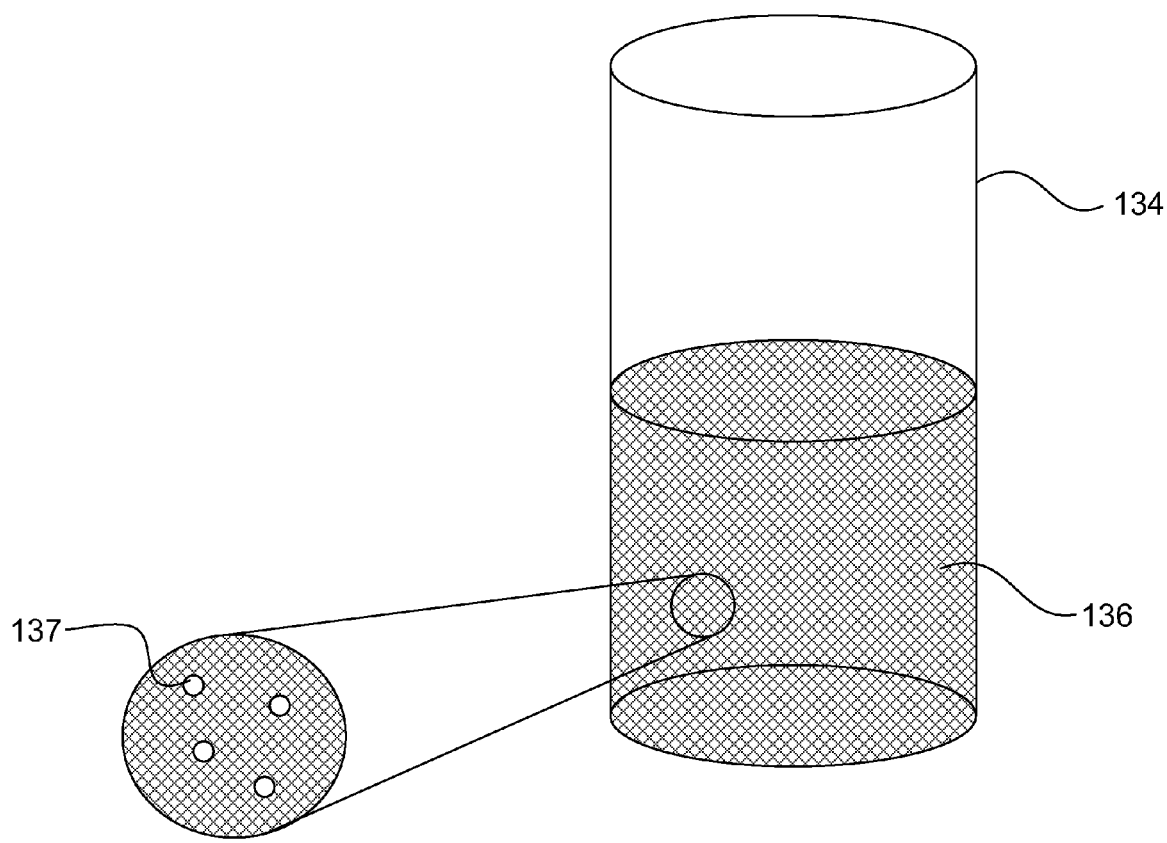
FIG. 2A          FIG. 2

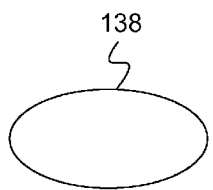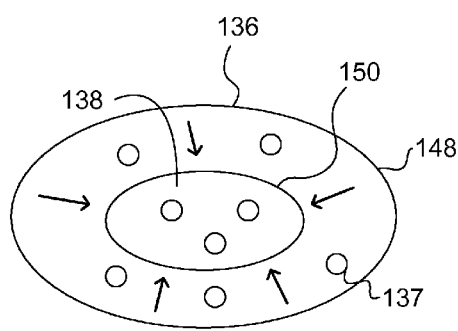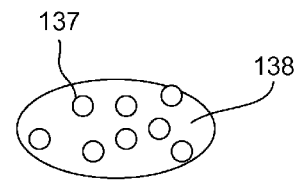
*FIG. 4A*  *FIG. 4B*  *FIG. 4C*

METHODS AND APPARATUS FOR INKJETTING SPACERS IN A FLAT PANEL DISPLAY

CROSS-REFERENCE TO RELATED APPLICATION

The present application claims priority to U.S. Provisional Patent Application Ser. No. 60/868,311, filed Dec. 1, 2006 and entitled "METHODS AND APPARATUS FOR INKJETTING BALL SPACERS", which is hereby incorporated herein by reference in its entirety for all purposes.

Further, the present application is related to the following commonly-assigned, co-pending U.S. patent applications, each of which is hereby incorporated herein by reference in its entirety for all purposes:

U.S. patent application Ser. No. 11/494,286, filed Jul. 27, 2006 and entitled "INKS FOR DISPLAY DEVICE MANUFACTURING AND METHODS OF MANUFACTURING AND USING THE SAME"; and U.S. patent application Ser. No. 11/521,177 filed Sep. 13, 2006 and entitled "METHOD AND APPARATUS FOR MANUFACTURING A PIXEL MATRIX OF A COLOR FILTER FOR A FLAT PANEL DISPLAY".

FIELD OF THE INVENTION

The present invention relates generally to flat panel display formation, and is more particularly concerned with apparatus and methods for providing spacers within or between photoactive layers of a flat panel display.

BACKGROUND

In flat panel displays, such as liquid crystal displays (LCDs), the photoactive devices, for example, liquid crystals, are typically positioned in an array within a single photoactive layer. To provide sufficient space within the photoactive layer for the liquid crystals to operate properly, 'spacers' are deposited within the photoactive layer to maintain a desired layer thickness and to act as supports.

Spacers have been produced using photolithographic processes, but such processes have proven time-consuming and expensive. What is needed are cost-effective methods of depositing spacers that are reliable and accurate.

SUMMARY OF THE INVENTION

In some aspects of the invention, a method of depositing a spacer on a substrate is provided. The method includes (1) depositing a first ink including an adhesive agent on a first area of the substrate; and (2) depositing a second ink including supporting elements on a second area of the substrate, the second area overlapping at least a portion of the first area. A portion of the second ink evaporates such that the supporting elements within the second ink migrate into the first area and bond to the adhesive agent in the first ink, forming a spacer.

In other aspects of the invention, a method of depositing a plurality of spacers on a substrate is provided. The method includes (1) depositing a first ink including an adhesive agent on a plurality of first areas of the substrate; and (2) depositing a second ink including supporting elements on a plurality of second areas of the substrate, each of the second areas greater than and encompassing one of the first area. A portion of the second ink in each of the second areas evaporates such that the supporting elements within the second ink migrate into the first areas and bond to the adhesive agent in the first ink, forming spacers.

In yet other aspects of the invention, an apparatus for depositing a spacer on a substrate is provided. The apparatus includes (1) a first inkjet print head adapted to deposit a first ink including an adhesive agent on a first area of the substrate; and (2) a second inkjet print head adapted to deposit a second ink including supporting elements on a second area of the substrate, the second area greater than and encompassing the first area. A portion of the second ink evaporates such that the supporting elements within the second ink migrate into the first area and bond to the adhesive agent in the first ink, forming a spacer.

Other features and aspects of the present invention will become more fully apparent from the following detailed description, the appended claims and the accompanying drawings.

BRIEF DESCRIPTION OF THE DRAWINGS

FIG. 2 is a schematic perspective view of an exemplary ball ink reservoir containing ball ink provided in accordance with an embodiment of the present invention.

FIG. 2A is an enlarged view of a portion of FIG. 2 showing the ball ink the ball ink reservoir.

FIGS. 4A through 4C are schematic illustrations of a sequence of steps in an exemplary process of adhesively bonding spacers to the adhesive ink on a substrate according to an embodiment of the present invention.

DETAILED DESCRIPTION

Direct deposition of spacers has been attempted as an alternative, more cost-effective technique for producing spacers in a flat panel display. In direct deposition, spacers are dispensed as drops from a printing apparatus such as an ink jet printer. The spacers may be deposited onto a substrate in the form of droplets of ink including suspended supporting elements which may include pellets, such as small spheres or balls. The individual supporting elements may be on the order of microns in diameter. The ink containing the supporting elements (e.g., balls) is referred to as ball ink. Once deposited on the substrate, the ball ink may be cured and dried, forming a solid having suitable supporting strength and elasticity. In its final, cured and dried form, the spacer may be substantially spherical in shape, but may form other shapes as well depending on the surface tension of the ball ink and other factors employed during deposition.

The inventors of the present invention have found that direct deposition of spacers may be unreliable in some cases, for example, when the spacers are deposited directly on a substrate, the ball ink may not cure or dry so as to provide sufficient adhesion to keep the spacers in place on the substrate. One attempt to solve this problem has involved providing the ball ink with adhesive properties, such as by adding adhesive solvents to the ball ink. When an adhesive is added in this manner, it has been found that the resulting ball ink may become unstable, may clog nozzles in the printing apparatus and, despite the addition of the adhesive, may fail to provide sufficient adhesion after deposition.

The present invention provides methods and apparatus for providing spacers in a photoactive layer that reliably adhere to a substrate and provide sufficient support for the photoactive layer. In some embodiments, an adhesive agent ('adhesive ink') is deposited in prescribed locations and given sufficient time to set; an ink containing supporting elements such as balls ('ball ink') is then deposited over the adhesive ink. The supporting elements migrate toward and stick to the adhesive agent in the adhesive ink as at least a portion of the ball ink evaporates, thereby resulting in a stable spacer arrangement within the photoactive layer. In some embodiments, the adhesive ink and ball ink are applied by inkjet print heads.

Figure 1:
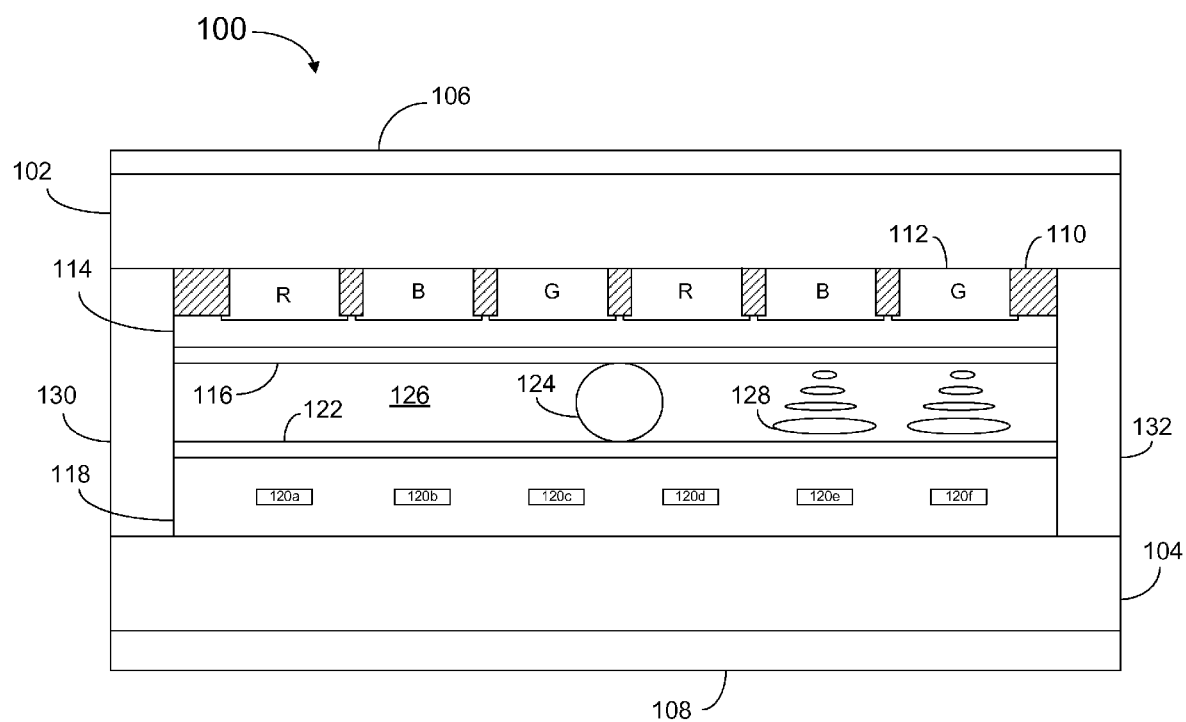
FIG. 1 is a schematic cross section of an exemplary flat display panel.

FIG. 1 is a schematic cross section of an exemplary embodiment of a flat display panel, in which liquid crystals are employed as the photoactive devices. The display panel 100 includes a first substrate 102 and a second substrate 104 disposed opposite from the first substrate 102 across a space within the panel 100. The external surface of the first substrate (on the side facing away from the second substrate 104) is covered with a first polarizer layer 106 and the external surface of the second substrate 104 (on the side facing away from first substrate 102) is covered with a second polarizer layer 108. A black resin matrix 110 is situated on the inner surface of substrate 102 opposite to polarizer layer 106. The black resin matrix 110 may include ink wells which may be filled with colored inks to form a color filter 112. In one or more embodiments, each ink well may be filled with a particular color of ink, while different wells may be filled with different colors of ink. For example, a consecutive group of wells in the black resin matrix 110 may be filled with red (R), green (G) and blue (B) ink respectively. Different colors of ink may be used. Examples of black matrix resin and ink wells that may be used in the context of the present invention are described in previously incorporated U.S. patent application Ser. No. 11/494,286.

An indium tin oxide layer ('ITO layer') 114, which may be used as an electrode, is situated over the black resin matrix 110 and color filter 112. A thin polyimide layer ('PI layer') 116 for aligning liquid crystal fluid is situated on the inner surface of ITO layer 114 opposite from the color filter 110.

On the side of the display panel 100 opposite to the black resin matrix 110 and color filter 112, a second ITO layer 118 is situated on the inner surface of the substrate 104 facing away from polarizer 108. Thin-film transistors ('TFTs') e.g., 120a, 120b, 120c, 120d, 120e, 120f, which are used as switching devices, are embedded in ITO layer 118. A second thin PI layer 122 is situated on the inner surface of ITO layer 118.

Spacers 124 are positioned in a gap 126 between the PI layers 116, 112 on substrates 102, 104, respectively. The spacers may have a diameter of 3 μm±300 Å, for example. Other spacer sizes may be used. The gap 126 may also be filled with photoactive liquid crystal material 128 and thus constitute a photoactive layer. Seals 130, 132 positioned at the lateral ends of the gap 126 are adapted to prevent the liquid crystal material from leaking from or otherwise escaping from the gap 126. In operation, when a voltage is applied across the photoactive layer using thin-film transistors 120a, 120b, 120c, 120d, 120e, 120f, the orientation of the liquid crystals 128 may be altered so as to change optical properties of the liquid crystal material 128, such as polarization direction. Changes in the optical properties of the liquid crystals may be used, in turn, to control the transmittance of light through the display panel 100.

To provide sufficient support for the photoactive layer, the spacers 124 may be distributed evenly and securely within the gap 126. It has been found that the spacers 124 may be effectively applied to a substrate by suspending supporting balls in ink and depositing the ball/ink mixture (i.e., ball ink) onto a substrate using an inkjet print head.

FIG. 2 is a schematic perspective view of an embodiment of a ball ink reservoir 134 containing ball ink 136 provided in accordance with the present invention. The ball ink 136 may be supplied, for example, by SEKISUI Inc. The ball ink 136 may include one or more solvents having varied weight percentages, evaporation rates, surface tensions, etc. FIG. 2A is an enlarged view of the ball ink 136 in the ball ink reservoir 134 including a plurality of supporting elements such as balls 137 suspended therein. The individual balls 137 may be composed of glass, polymer, and/or other materials, and may range in diameter. The concentration of the balls 137 per unit volume within the ball ink 136 may vary.

In order for the spacers 124 to ultimately adhere reliably to a substrate 102 when deposited, it has been found that it is advantageous to initially deposit an adhesive agent (termed 'adhesive ink') 138 onto the substrate 102 in prescribed locations prior to deposition of the ball ink 136. It is noted that while the substrate 102 may be coated with one or more layers such as a polyimide (PI) layer 116, the discussion herein refers to deposition on the substrate 102 for the sake of brevity. The adhesive ink 138 may also be deposited using an inkjet print head. Upon deposition, the adhesive ink 138 may be given sufficient time to set; thereafter, the ball ink 136 may be deposited onto the prescribed locations directly over adhesive ink. The ball ink 136 and adhesive ink 138 may be designed and/or selected to be compatible with one another; that is, the ball ink 136 may be designed and/or selected so that solvents or other substances contained in the ball ink do not degrade adhesive properties of the adhesive ink 138 upon contact and/or exposure.

Figure 3A:
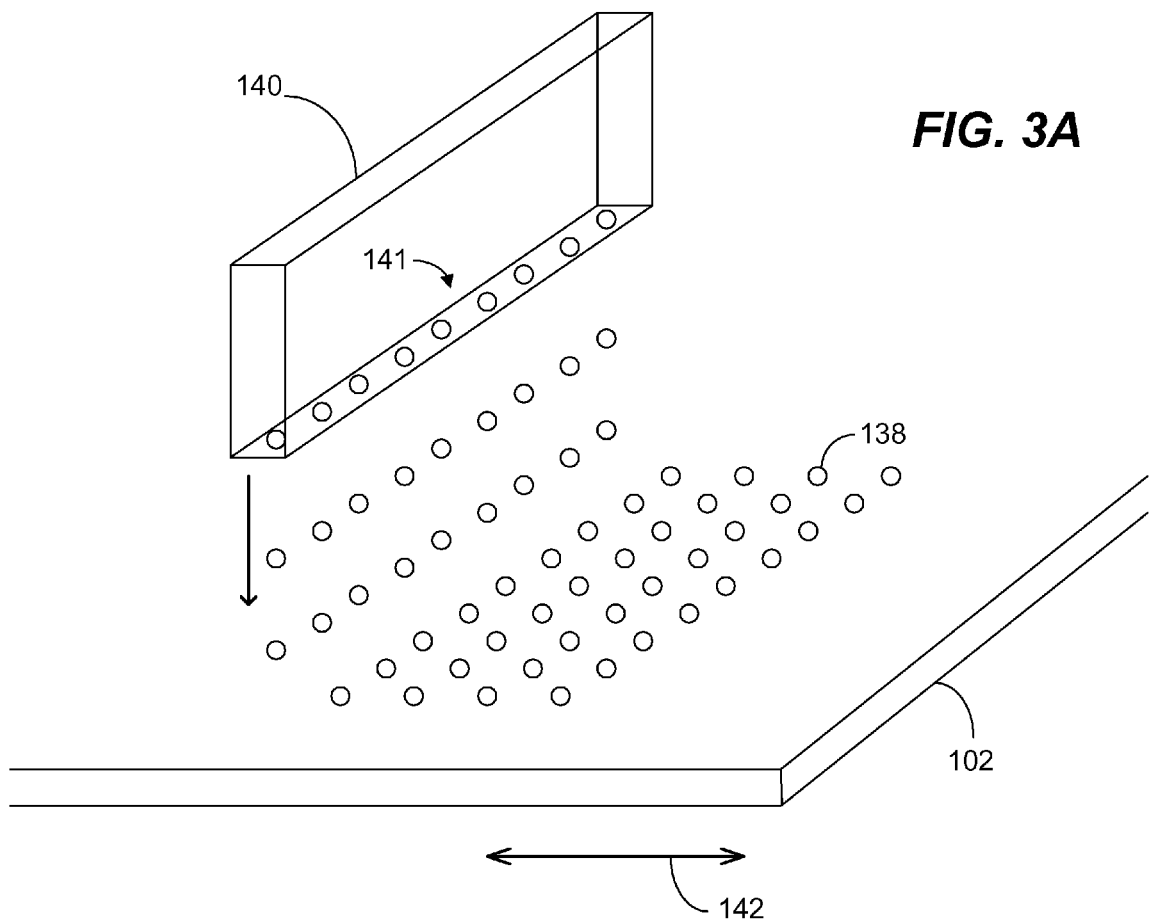
FIG. 3A is a schematic perspective illustration of deposition of an adhesive ink on a substrate according to an embodiment of the present invention.

FIG. 3A is a schematic perspective illustration of deposition of an adhesive ink 138 on a substrate using an ink jet print head ('adhesive ink print head') 140 containing adhesive ink 138. As shown, the adhesive ink print head 140 may comprise an ink jet print head having a set of nozzles 141 arranged in a line.

In some embodiments, the adhesive ink 138 may include approximately 15 wt. % of an elastic acrylic resin. Other types of adhesives may be used. For example, epoxies and/or silicone based adhesives may be used. The adhesive ink 140 may also contain one or more solvents. The solvents may be selected such that the adhesive ink 138 has a viscosity of approximately 3 cP to approximately 7 cP (e.g., 5 cP) or other suitable viscosity that allows the adhesive ink 138 to be effectively dispensed from the adhesive ink print head 140 at suitable drop sizes without clogging the nozzles 141. The circumference/volume of the adhesive ink drops 138 may vary among a broad range of suitable drop sizes.

In some embodiments, two-part adhesives may be used. For example, an epoxy adhesive may be used where a first part includes a resin and a second part includes a hardener or accelerator. The two parts may be applied in separate passes of the adhesive ink print heads. For example, a first pass of a first head may apply the resin and a second pass of a second head may apply a hardener. In other embodiments, adhesives that are activated by moisture from the air or applied vapors may be used. As indicated above, in some embodiments, the evaporation of a solvent may be used to activate the adhesive.

To aid in depositing the adhesive ink drops 138 onto the desired regions over the substrate 102, the substrate 102 may be aligned and moved in the directions indicated by arrow 142 (y-axis direction) perpendicular to the longitudinal alignment (x-axis direction) of the nozzles 141 of the adhesive ink print head 140. Alternatively or additionally, the adhesive ink print head 140 may be indexed or moved in the x and/or y-axis directions.

After the adhesive ink 138 is deposited, it may be allowed to set, during which at least a portion of the solvent(s) in the ink evaporates. The adhesive ink drops 138 may be allowed to dry for a predefined amount of time based on, for example, the characteristics and concentration of the included solvent(s) prior to subsequent deposition of ball ink 136 onto the adhesive ink. In alternative embodiments using a two-part adhesive ink 138 for example, a hardener/accelerator may be applied immediately (or after a settling period) and/or may be included in the ball ink 136.

In one or more embodiments, a setting time of the adhesive ink 138 may be reduced by providing heat energy to increase the evaporation rate of the solvent(s) contained in the adhesive ink 138. The evaporation rate of the solvent(s) in the adhesive ink 138 may be adjusted in various ways, including, for example, heating the substrate 102 or by exposing the adhesive ink 138 to a flow of heated gas. When direct heating is employed, the substrate 102 may be heated to a temperature range suitable to increase the evaporation rate of the solvent(s) without damaging the substrate 102 etc. Additionally or alternatively, when a flow of heated gas is introduced, the gas may be provided at a temperature range suitable to increase the evaporation rate of the solvent(s) without damaging the substrate 102 etc., and may be blown onto the substrate for a variable period of time selected to optimize throughput, for example.

Figure 3B:
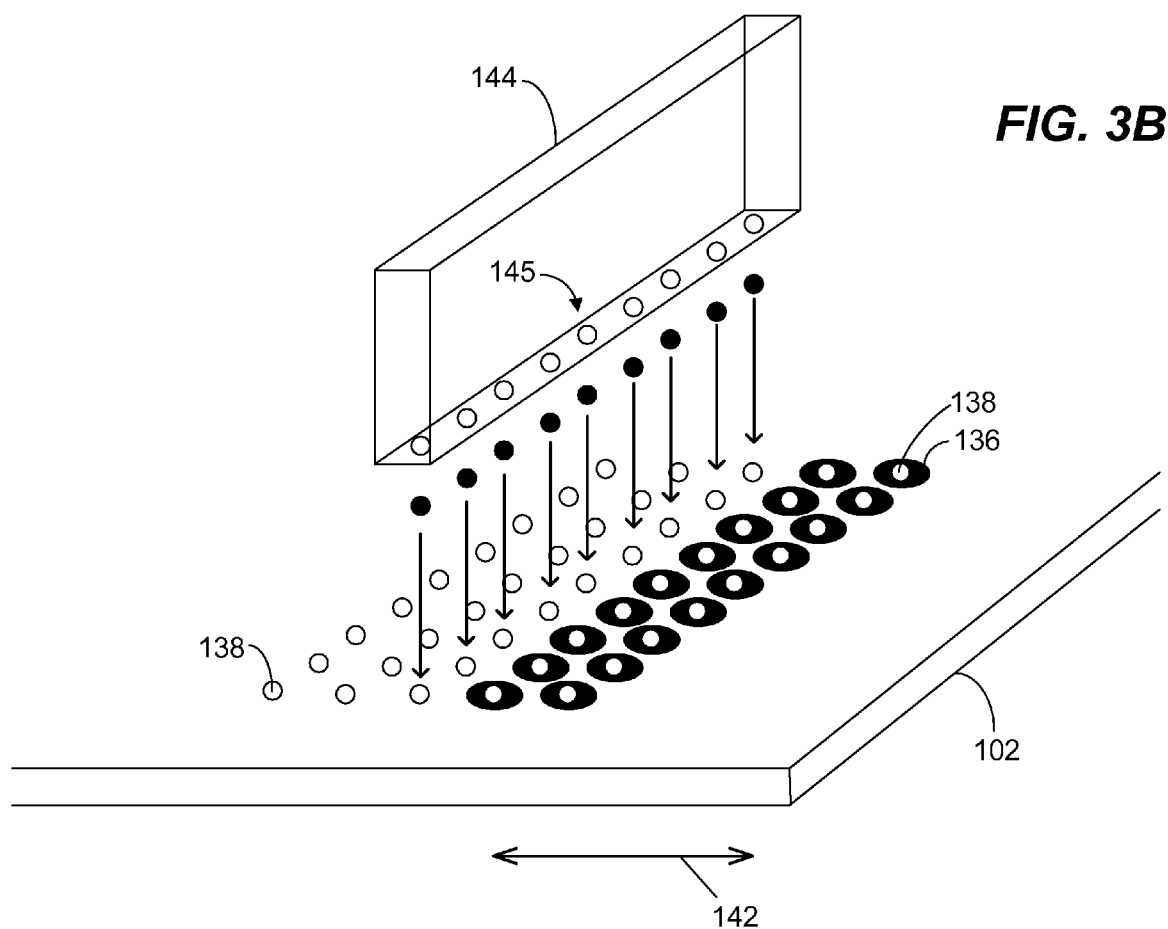
FIG. 3B is a schematic perspective illustration of deposition of ball ink over adhesive ink on a substrate according to an embodiment of the present invention.

After the adhesive ink drops 138 have been deposited and/or set, the ball ink 136 may be deposited directly onto the drops of adhesive ink, preferably with the center of the ball ink drops 136 approximately coinciding with the center of the adhesive ink set on the substrate 102. FIG. 3B is a schematic perspective illustration of deposition of ball ink drops over drops of adhesive ink 138 using another ink jet print head 144 ('ball ink print head').

A ball ink print head 144 deposits drops of ball ink 136 through a set of nozzles 145 onto the drops of adhesive ink 138. Each of the drops of ball ink 136 may cover the entire adhesive ink drop 138 onto which each is deposited and may also cover a portion of the substrate 102 surrounding the adhesive ink drops 138. For example, the size of each ball ink drop 136 on the substrate 102 may range from a size smaller than the adhesive ink drops to larger than the adhesive ink drops. As described in reference to FIG. 3A, the substrate 102 may be aligned and moved in the y-axis direction and the ball ink print head 144 may be aligned and moved in the x-axis and/or y-axis directions in order to cover prescribed regions of substrate 102.

It is noted that the ball ink 136 and the adhesive ink 138 may have physico-chemical characteristics which may be adjusted to render them suitable for the ink jet deposition process provided by the present invention. Previously incorporated U.S. patent application Ser. No. 11/494,286 describes various ink solvents and suitable physico-chemical properties of such solvents which may be applied in the context of the present invention. Such characteristics may include one or more drying times, surface tensions, the evaporation rates and the viscosities of the solvents, resins and other chemical species included in the ball 136 and adhesive inks 138. These characteristics may be interrelated and may affect the size and number of ink droplets or drops dispensed from an inkjet print head, the tendency of an ink to dry onto one or more nozzles of an inkjet print head and possibly clog it, the shape of ink drops dispensed from the nozzles of an inkjet print head, etc. Optimal control of such characteristics may, for example, reduce clogging, improve the uniformity of ink drop sizes, achieve rapid evaporation of the ball ink solvent and improved adhesion of the balls in the ball ink to the adhesive ink.

FIGS. 4A through 4C are schematic illustrations of a sequence of steps in an exemplary process of adhesively bonding spacers 124 to the adhesive ink 138 on a substrate 102.

In FIG. 4A, a drop of adhesive ink 138 is applied to a first area on the substrate 102 and allowed or induced to set (e.g., using a hardener). In the process of setting, as discussed above with reference to FIG. 3A, in some embodiments, at least a portion of a solvent in the adhesive ink 138 evaporates, reducing the volume of the adhesive ink drop. As the adhesive ink drop 138 sets in such embodiment, the adhesive ink drop 138 becomes securely attached to the substrate 102. In the next step of the process shown in FIG. 4B, a drop of ball ink 136 is deposited on a second area of the substrate 102 over the adhesive ink drop 138. The second area including the ball ink drop 136 may be greater than the first area including the adhesive ink drop 138 and preferably encompasses the latter. A portion of the solvent in the ball ink drop 136 then evaporates, assisted by addition of heat energy or otherwise. As the solvent(s) in the ball ink drop 136 evaporates, the outer edge 148 of the ball ink drop 136 shrinks inwardly (i.e., the second area including the ball ink drop 136 decreases in size) in the direction of the arrows. Due to surface tension affects, as ball ink 136 shrinks, individual balls 137 within the ball ink 136 that are initially positioned outside of the outer edge 150 of adhesive ink drop 138 migrate toward the first area into contact with the adhesive ink drop 138.

An exemplary final stage of the ball ink solvent evaporation process is illustrated in FIG. 4C. As shown, the individual balls 137 present in the dispensed ball ink drop 136 have migrated onto and bonded to the adhesive ink drop 138 by action of the adhesive agent within the adhesive ink drop 138. The combination of the bonded balls 137, the adhesive ink drop 138 and any residual solvent(s) or resins from the ball ink 136 forms a spacer 124 securely coupled to the substrate via the bond between the adhesive ink drop 138 and the substrate 102.

In alternative embodiments, for example using two-part adhesives without evaporative solvents, the adhesive ink drops 138 and the ball ink drops 136 may be approximately the same size and the migration due to shirking as solvent evaporates as described above may be avoided.

The bond between the spacer 124 and the substrate 102 may be subjected to vibration and impact tests to ensure that the spacers 124 will remain firmly attached within the panel 100 under a variety of plausible working conditions. For example, the bonding of the spacers 124 to the substrate 102 may designed to withstand vibrations within a prescribed range of amplitudes and frequencies over a certain time period. In addition, the spacers 124 may be required to withstand a prescribed amount of impact force applied parallel to or at an angle to the major surface of the substrate 102 without becoming dislodged.

Figure 5:
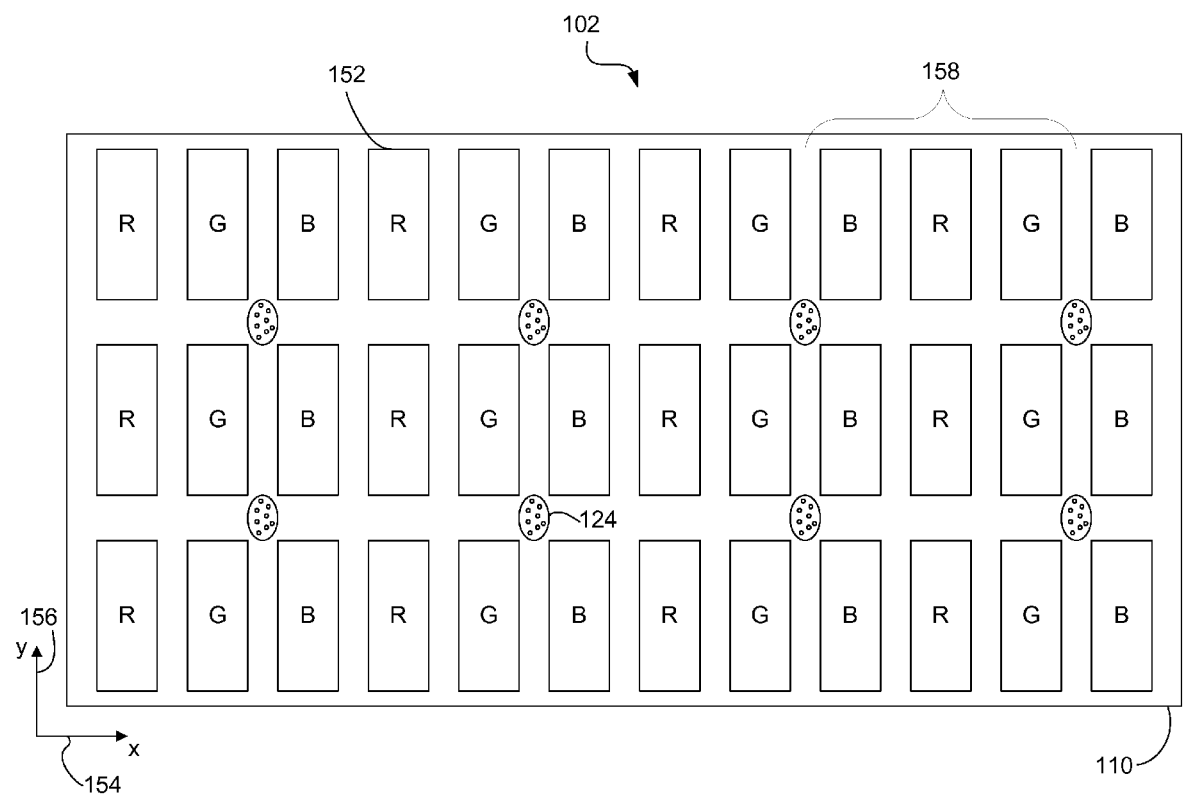
FIG. 5 depicts a schematic enlarged view of a portion of a display panel in which spacers are positioned at selected intersections within the panel.

FIG. 5 depicts a schematic enlarged view of a portion of a display panel 100 in which spacers 124 are positioned at selected intersections of a black resin matrix 110. The spacers 124 are bonded to areas in which adhesive ink 138 has been deposited as described above. The black resin matrix 110 of the panel 100 may include pixel wells 152 evenly spaced in the horizontal x-y plane 154, 156. Each pixel well 152 may be filled with a particular color of ink. In some embodiments, a consecutive set 158 of three adjacent pixel wells 152 may be filled with red (R), green (G) and blue (B) ink respectively. Such a set 158 may constitute a 'pixel' of the display panel 100. In order to adequately support the substrates 102 and 104 and retain an adequate gap 126 for containing the liquid crystal material 128, the spacers 124 may be positioned at one-pixel intervals in the horizontal plane of the display panel 100. Smaller or larger intervals may be used.

Figure 6:
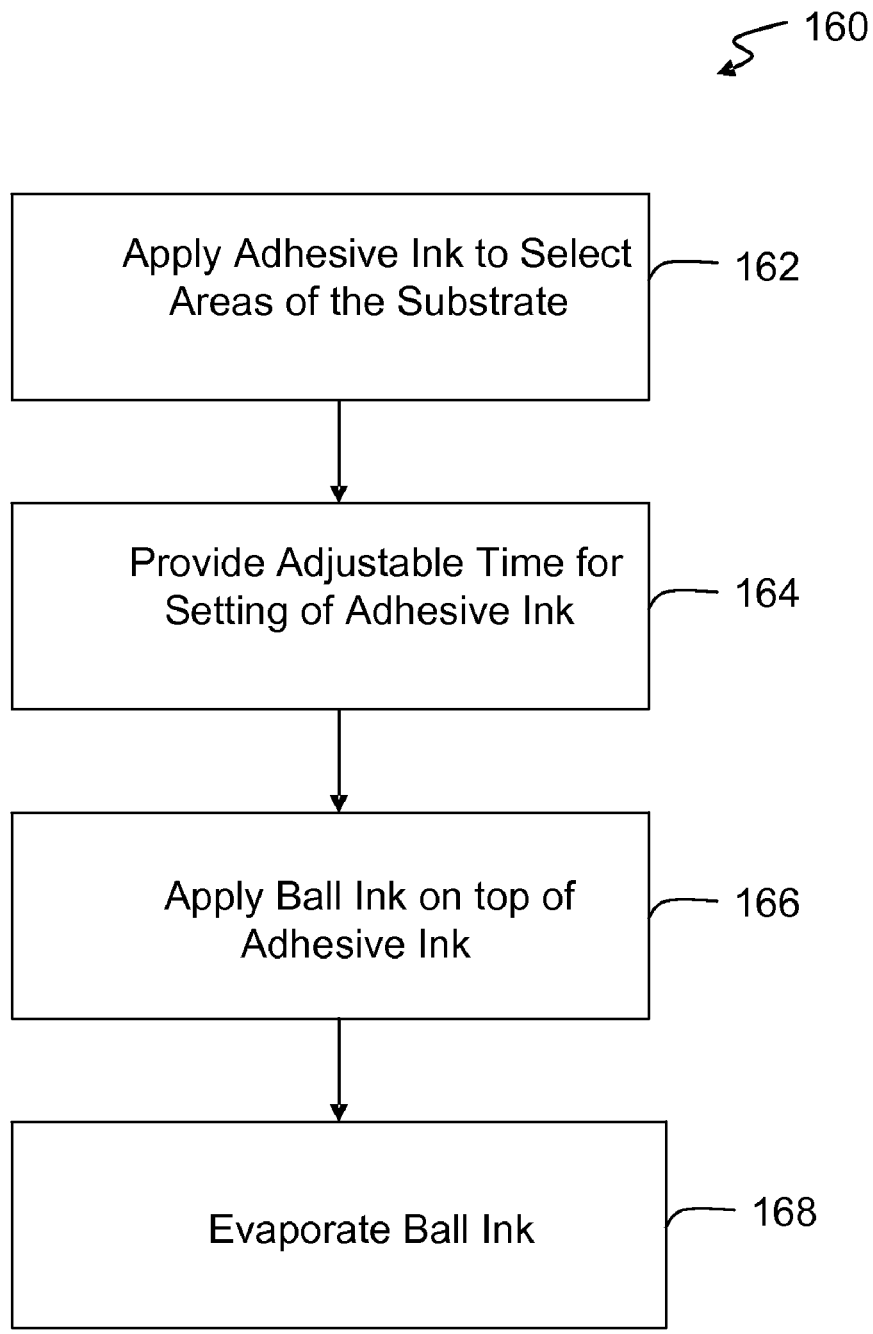
FIG. 6 is a flow chart of a method of depositing spacers onto a substrate according to an embodiment of the present invention.

FIG. 6 is a flow chart depicting an example method 160 of depositing spacers 124 onto a substrate 102 according to some embodiments of the present invention. In step 162, adhesive ink drops 138 are deposited onto selected first areas of the substrate 102 by adhesive ink print head 140. In step 164, an adjustable time is provided for allowing the adhesive ink drops 140 to set or cure, whereby the adhesive ink drops become securely bonded to the substrate 102. In step 164, the setting of the adhesive may be induced and/or assisted by providing heat, a hardener, or other energy or chemical (e.g., by heating the substrate 102, blowing a heated gas onto the adhesive ink, applying UV light, applying an accelerator, etc.) After the adhesive ink drops 138 have set, in step 166 ball ink drops 136 are applied on second areas over (and encompassing) the first areas including the adhesive ink drops 138. In step 168, solvent(s) in the ball ink 136 drops evaporate. The evaporation of the ball ink solvent(s) may be assisted by providing energy (e.g., heat) similarly to step 164. As evaporation of the ball ink solvent(s) proceeds, the second areas including the ball ink drops 136 shrink and the individual balls 137 included in the ball ink 136 migrate inwardly toward the first areas containing the adhesive ink drops 138. The individual balls 137 then form a bond with the adhesive ink drops 138, forming spacers 124. The spacers 124 are in turn securely coupled to the substrate 102 via the previously set bond between the adhesive ink drops 138 and the substrate 102. In alternative embodiments using a two-part adhesive ink 138 for example, a hardener/accelerator may be applied immediately (or after a settling period) as an additional step and/or may be applied by including the hardener in the ball ink 136.

The foregoing description discloses only exemplary embodiments of the invention. Modification of the above disclosed apparatus and methods which fall within the scope of the invention will be readily apparent to those of ordinary skill in the art. For instance, although only examples of depositing in two passes are disclosed, the present invention could be modified to deposit in more passes. Further, although use of uniformly-sized spacers is shown above, in some embodiments, the apparatus may deposit spacers of different shapes and sizes.

Accordingly, while the present invention has been disclosed in connection with exemplary embodiments thereof, it should be understood that other embodiments may fall within the spirit and scope of the invention, as defined by the following claims.

The invention claimed is:

1. A method of depositing a spacer on a substrate comprising:
   depositing a first ink including an adhesive agent on a first area of the substrate; and
   depositing a second ink including supporting elements on a second area of the substrate, the second area encompassing the first area;
   wherein a portion of the second ink in the second area evaporates such that the supporting elements within the second ink migrate into the first area and bond to the adhesive agent in the first ink, forming a spacer.

2. The method of claim 1, further comprising:
   prior to depositing the second ink in the second area, inducing the first ink to set.

3. The method of claim 2, wherein inducing the first ink to set includes assisting evaporation of a portion of the first ink.

4. The method of claim 3, wherein the assisting evaporation of a portion of the first ink includes providing heat energy to the first ink.

5. The method of claim 4, wherein providing heat energy includes directly heating the substrate.

6. The method of claim 4, wherein providing heat energy includes exposing the first ink to a flow of heated gas.

7. The method of claim 1, wherein the first ink contains approximately 15 wt. % of an elastic acryl resin.

8. The method of claim 7, wherein the adhesive ink has a viscosity of approximately 5 cP.

9. The method of claim 1, wherein the spacer has a diameter of approximately 3 μm±300 Å.

10. The method of claim 1, further comprising:
    depositing a first ink including an adhesive agent on a third area of the substrate; and
    depositing a second ink including supporting elements over the deposited first ink, the second initially covering fourth area on the substrate encompassing the respective third area.

11. The method of claim 10, wherein the substrate includes a color filter having a series pixels mutually spaced apart by a pixel interval, and the third and fourth areas are spaced apart from the first and second areas by approximately one pixel interval.

12. The method of claim 1, wherein the substrate includes a color filter having a series pixels mutually spaced apart by a pixel interval, and the third and fourth areas are spaced apart from the first and second areas by approximately one pixel interval.

13. A method of depositing a plurality of spacers on a substrate comprising:
    depositing a first ink including an adhesive agent on a plurality of first areas of the substrate; and
    depositing a second ink including supporting elements on a plurality of second areas of the substrate, each of the second areas greater than and encompassing one of the first area;
    wherein a portion of the second ink in each of the second areas evaporates such that the supporting elements within the second ink migrate into the first areas and bond to the adhesive agent in the first ink, forming spacers.

* * * * *